Feb. 16, 1960  J. C. SHARMAN ET AL  2,924,955
CONSTANT VELOCITY UNIVERSAL JOINTS
Filed March 31, 1958  3 Sheets-Sheet 1
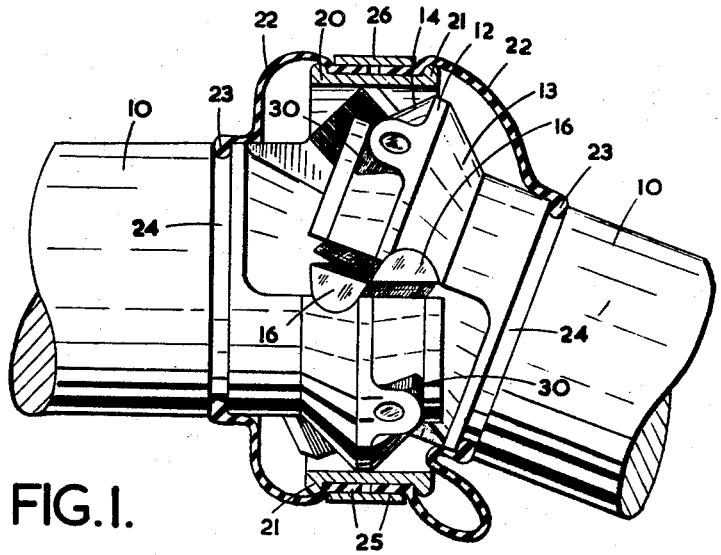
FIG.I.
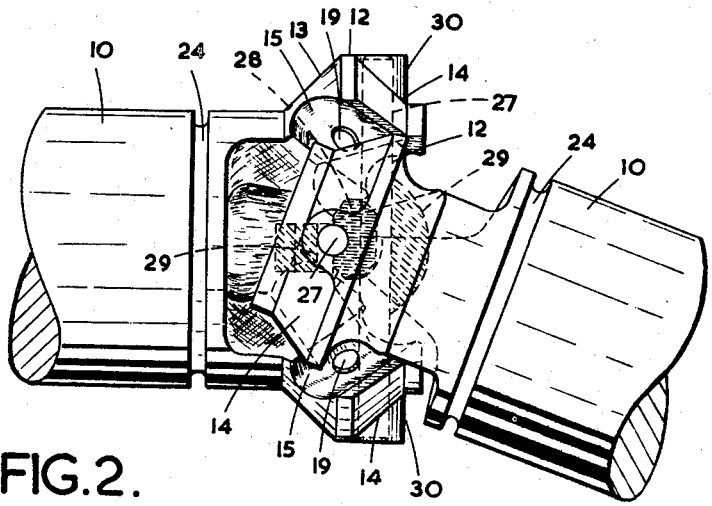
FIG.2.
INVENTORS:
John Charles Sharman
Benjamin Charles Carter
BY
Richardson, David and Nordon
ATTORNEYS.

United States Patent Office 2,924,955
Patented Feb. 16, 1960

2,924,955

CONSTANT VELOCITY UNIVERSAL JOINTS

John Charles Sharman, Great Barr, Birmingham, and Benjamin Charles Carter, Farnham, England, assignors to Garringtons Limited, Darlaston, England, a British company Application March 31, 1958, Serial No. 725,333

Claims priority, application Great Britain April 16, 1957

6 Claims. (Cl. 64—21)

This invention relates to constant velocity universal joints for coupling together rotatable shafts whose axes are arranged in angular relationship, or whose axes are capable of angular divergence.

The type of joint to which the present invention relates is that which comprises two half joints, each of which has angularly spaced transmitting arms radiating from a shaft portion, the arms of one half entering the spaces between the arms of the other half, and each half having pivotally mounted on its transmitting arms, driving members (such as semi-cylindrical pads), which co-operate with corresponding driving members on the arms of the other half to transmit the drive from one half joint to the other.

The primary object of the present invention is to provide improvements to such a universal joint to enable it to operate in applications where it is necessary to control any relative movement between the two halves in the axial direction.

A large proportion of such applications occur in cases where the maximum angle of divergence between two shafts is relatively small and may, for example, be of the order of 20° or less. Typical examples of cases where such a universal joint is required are found in automobile propeller shafts between the gear box and the torque tube, and between the torque tube and the differential. Further objects of the invention are to provide improvements which will enable production of a relatively inexpensive joint, suitable for mass production and particularly adapted for use in such cases where the angular divergence of the shafts is low.

According to the present invention we provide a universal joint of the type above specified wherein each half of the joint has a rod extending diametrically between two opposed transmitting arms, the two joint halves being assembled so that the two rods are in cruciform relationship and have a pressure pad engaged between them whereby any tendency towards movement apart of the two halves results in the two rods acting to apply pressure to said pressure pad and each rod, on its face remote from the other rod, being in engagement with a bearing member provided in or on the body of the joint half whereby any tendency towards movement together of the two halves of the joints results in each rod applying pressure upon its respective bearing member.

The advantage arising from this arrangement and other advantages will be better understood from the following description of one example of universal joint, as shown in the accompanying drawings, which is given in order to illustrate the invention in a practical form as applied to a universal joint particularly suitable for low angle application.

In the accompanying drawings:

Figure 1 is a side view of the assembled joint with the outer housing shown in section.

Figure 2 is a plan view taken at 45° to the vertical in Figure 1 and with the outer housing and driving pads removed.

Figure 3:
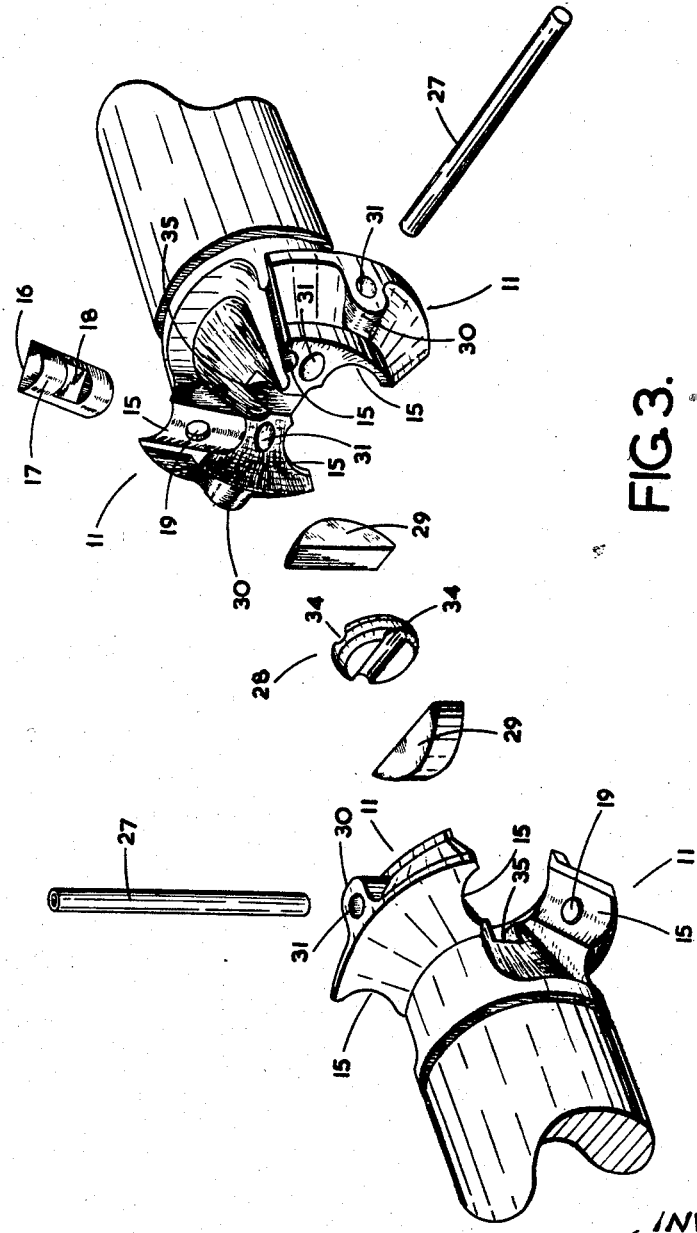
Figure 3 is an exploded view to show the relationship between the various components.

Each half joint is formed with a short shaft portion 10, at one end of which there is integrally formed a pair of transmitting arms 11 (see Figure 3), each arm being inclined upwardly and outwardly away from the axis of the shaft portion, the angle of inclination of the two arms with respect to the axis of the shaft portion being the same for each half.

In cases where it is desired to install this joint in an existing transmission system (e.g. a vehicle propeller shaft drive) the following convenient method may be adopted for securing one half joint to an apertured flange when it is installed. The shaft portion 10 of the half joint may have its extreme end formed with a series of serrations, after this end has been machined to a suitable diameter (if such is necessary) and then the serrated end may be driven, as a force fit, into the aperture of said flange and locked by welding.

On the other hand, the or each half-joint may be formed with an appropriate flange on its shaft portion 10.

Each arm 11 increases in width from its end connection with the shaft portion 10 to its radially outermost edge 12 and the external surface 13 between these two positions is substantially part of the surface of a cone co-axial with the axis of the shaft portion. At its edge 12 the outer end face 14 of the arm reverses in direction and is also part of the surface of a co-axial cone.

This formation of each half joint makes it very acceptable for a closed die forging process because the various external surfaces such as 13, 14, have natural "draft" so that there is no difficulty involved in separating the forging from the dies and no complicated die design.

Each arm 11 is formed with two grooves 15, of semi-circular cross-section, to receive the semi-cylindrical driving pads 16 which form the driving members between the two half joints. The grooves 15 are formed in the side faces of the arms 11, the axis of each groove being inclined at an angle of 45° or thereabouts to the axis of shaft portion 10 and the axes of all the grooves 15 being convergent forwardly on to the shaft portion axis for each half joint respectively.

A further advantage of this particular form of the half joints is that it permits these grooves 15 to be formed accurately but simply and economically by conventional drilling and reaming operations. A half joint may be forged with the arms 11 solid and ungrooved and then the grooves 15 may be machined, or, the initial forging may be completely solid, with the spaces between the arms filled in (i.e. it would have a double frusto-conical form); four holes can then be drilled and reamed at the positons of the grooves and the excess metal, between the arms cut away to leave the required semi-cylindrical grooves 15.

Figure 6:
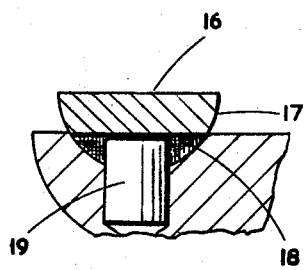
Figure 6 is a fragmentary section showing a detail of construction.

In each groove 15 there is mounted the semi-cylindrical pad 16 and on its underside or curved face 17, each pad has a transversely extending slot 18 which is adapted to engage over the projecting end of a locking pin 19, driven into a hole drilled into the transmitting arm from the bottom of the associated groove 15, and this peg 19 serves to prevent the pad from being displaced endwise out of its associated groove (see Figures 3 and 6).

Alternatively, the pads 16 may be located against endwise movement by means of abutment members secured severally to the arms 11 at the inner and outer ends of the pads, each such member engaging two pads and being located between them. There may be an annular groove in each end of the pad to accommodate a short projection from the corresponding abutment member.

When the two half joints, with their associated pads 16 (four in number for each half) are assembled together, with the arms of the one half projecting into the spaces between the arms of the other half, the flat faces of the pads 16 come into driving engagement and the joint is then a constant velocity universal joint working on known principles.

In order to completely enclose the joint against entry of dirt or moisture and in order to retain lubricant, where such is provided, there is provided an outer ring 20 (Figure 1) encircling the transmitting arms and providing means for attachment of a flexible housing.

This ring 20 is provided at each end with a small radially outwards extending peripheral lip 21, and the flexible housing is in the form of two part cylinders 22 of rubber or like flexible material, one end of which is of reduced diameter formed with an inwardly projecting lip 23 which is adapted to engage in a peripheral groove 24 formed in the shaft portion 10 of the half joint adjacent the transmitting arms. The other and enlarged end 25 of each part-cylindrical housing 22 is adapted to engage over the peripheral lip 21 of the outer ring, and has a short axial portion which sits upon the outer surface of the ring 20 in between its ends, and when the two parts 22 of the flexible housing are thus assembled on the ring 20, they are clamped in position by means of a metal strip 26, which encircles the ring, and has its ends engaged in a buckle.

When angular divergence of the shafts takes place during operation, the rubber of either part 22 of the flexible housing is not subjected to any kinking which might lead to fracture it, but rather rubber part merely has a form of diaphragm motion and this motion, in conjunction wit the relative motion between the two half joints sets up a pumping action on the grease or othere lubricant within the housing thus ensuring adequate and efficient distribution of lubricant. The outer ring 20 also acts as a form of thrower ring for any grease or lubricant which is thrown against the inside of this ring.

Except for unequal distribution of lubricant, and metal density, the joint is otherwise perfectly balanced and by appropriate choice of the length of the metal strap 26 round the housing and the size of the buckle, any possibility of out of balance due to these factors can be substantially eliminated.

Figure 4:
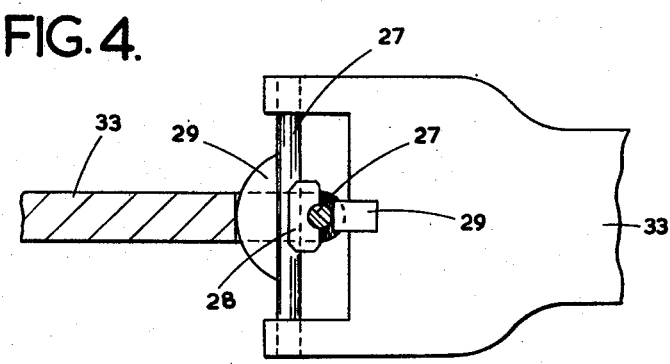
Figure 4 is a diagrammatic view to show the operation of the restraining means.
Figure 5:
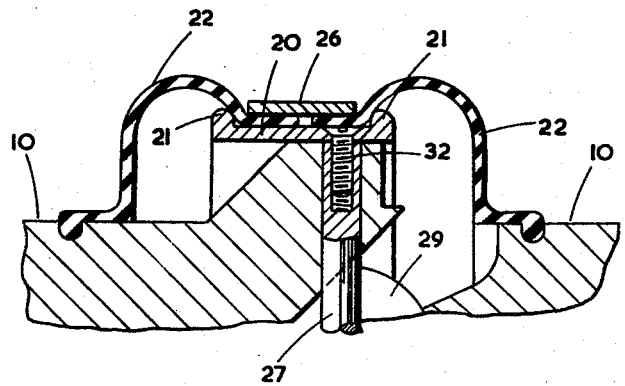
Figure 5 is a fragmentary section showing a detail of construction.

The restraining means which controls relative axial movement between the two joint halves is best seen in Figures 3, 4, and 5 and comprises the two rods 27, central pressure pad 28 and two bearing members 29.

Each transmitting arm is formed on its end surface 14 with a raised boss 30 through which a hole 31 is drilled which is at right angles to the axis of the shaft portion 10, and one of the rods 27 is inserted in each of these pairs of holes 31.

The rods are prevented from coming out of the holes in the arms of the presence of the outer ring 20 and, if desired, the two screws 32 which secure the ring to one half joint may be arranged (as shown in Figure 5) to screw into tapped holes in the ends of the one rod 27.

Figure 4 is a diagrammatic sketch showing the manner in which the two rods engage in the assembled joint. The two members 33 represent the two halves of the joint in this sketch.

It will be seen that the pressure pad 28 is disposed between the rods 27 and this pressure pad comprises a block (which may be of bronze) in which two opposed side faces have been formed with semi-cylindrical grooves 34 which are mutually at right angles, the pad 28 being inserted between the rods 27 so that the rods have bearing engagement in the grooves 34.

In this arrangement each rod 27 is capable of axial sliding movement relative to the pressure pad 28 so that a "scissors" action can take place between the rods when the joint is working and the presence of the rods does not interfere with the constant velocity characteristics of the joint.

The restraining means is completed by the two bearing members 29 each of which consists of a semi-circular key seating in a slot 35 cut in the half joint in between the transmitting arms. The bars 27 bear against the flat faces of the members 29 which can rock in the slots 35 during operation of the joint.

When the joint is working under axial tension, tending to separate the two halves, the two rods 27 are applying pressure inwardly upon the pad 28 and when the joint is under compression tending to move the two halves together the pressure from the rods 27 is applied to the bearing members 29.

This arrangement gives an even distribution of the load and consequently keeps to a minimum the stresses imposed on the joint due to tensile and compressive actions.

If a joint is required in which a predetermined amount of relative axial movement between the two halves is desirable then this can be achieved by choice of a suitable thickness for the pressure pad 38.

It is considered that there is a much wider field of application for a constant velocity universal joint capable of up to 20° angular divergence than for a joint capable of divergence over 20° and up to 40°.

As mentioned, it is thought that the joint according to the present invention will find very advantageous application in motor vehicles transmissions and should give longer life than existing joints and couplings. As a motor vehicle propeller shaft does not have a perfectly uniform angular velocity it is thought that the use of the present invention, with its constant velocity properties should help in giving smoother and quieter running.

What we claim then is:

1. In a universal joint comprising two half-joints, a shaft portion on each half-joint, angularly spaced transmitting arms radiating from each shaft portion, driving members pivotally mounted on said transmitting arms, the arms of one half-joint being disposed in the spaces between the arms of the other half-joint and the driving members on the two sets of arms being in cooperating engagement to transmit the drive from one half-joint to the other; a rod in each half-joint extending diametrically between two opposed transmitting arms of the half-joint, said two rods being disposed one behind the other in cruciform relationship in the assembled joint, so as to prevent separation of the two half-joints, a pressure pad engaged between said two rods, a bearing member provided in the body of each half-joint and the face of each rod which is remote from the other rod, being in engagement with the bearing member which is provided in the half-joint associated with said other rod.

2. In a universal joint comprising two half-joints, a shaft portion on each half-joint, angularly spaced transmitting arms radiating from each shaft portion, driving members pivotally mounted on said transmitting arms, the arms of one half-joint being disposed in the spaces between the arms of the other half-joint and the driving members on the two sets of arms being in cooperating engagement to transmit the drive from one half-joint to the other; a rod in each half-joint extending diametrically between two opposed transmitting arms of the half-joint, a pressure pad engaged between said two rods, said pressure pad having two opposed faces each of which has a straight groove of part-circular cross-section and the two grooves being mutually at right angles, said two rods being disposed one behind the other in the assembled joint and engaging in said grooves so as to prevent separation of the two half-joints, a bearing member provided in the body of each half-joint and the face of each rod which is remote from the other rod, being in engagement with the bearing member which is provided in the half-joint associated with said other rod.

3. In a universal joint comprising two half-joints, a shaft portion on each half-joint, angularly spaced transmitting arms radiating from each shaft portion, driving members pivotally mounted on said transmitting arms, the arms of one half-joint being disposed in the spaces between the arms of the other half-joint and the driving members on the two sets of arms being in cooperating engagement to transmit the drive from one half-joint to the other; a rod in each half-joint extending diametrically between two opposed transmitting arms of the half-joint, said two rods being disposed one behind the other in cruciform relationship in the assembled joint so as to prevent separation of the two half-joints, a pressure pad engaged between said two rods, the body of each half-joint having a slot cut therein, a bearing member in the form of a part-circular plate having a straight face and a curved face being mounted in the body of each half-joint with the curved face of the bearing member seated in the slot, and the face of each rod which is remote from the other rod, being in engagement with the straight face of the bearing member which is provided in the half-joint associated with said other rod.

4. In a universal joint comprising two half-joints, a shaft portion on each half-joint, angularly spaced transmitting arms radiating from each shaft portion, driving members pivotally mounted on said transmitting arms, the arms of one half-joint being disposed in the spaces between the arms of the other half-joint and the driving members on the two sets of arms being in cooperating engagement to transmit the drive from one half-joint to the other; a rod in each half-joint extending diametrically between two opposed transmitting arms of the half-joint, said two rods being disposed one behind the other in cruciform relationship in the assembled joint, so as to prevent separation of the two half-joints, a pressure pad engaged between said two rods, a bearing member provided in the body of each half-joint the face of each rod which is remote from the other rod, being in engagement with the bearing member which is provided in the half-joint associated with said other rod, a circular ring surrounding the joint and secured to one of said half-joints, and an outer housing of rubber surrounding the joint, said housing being in two separate halves, one end of each half being secured to said ring, the other end of each half being secured to the adjacent half-joint.

5. In a universal joint comprising two half-joints, a shaft portion on each half-joint, angularly spaced transmitting arms radiating from each shaft portion, driving members pivotally mounted on said transmitting arms, the arms of one half-joint being disposed in the spaces between the arms of the other half-joint and the driving members on the two sets of arms being in cooperating engagement to transmit the drive from one half-joint to the other; two opposed transmitting arms of each half-joint being each provided with a hole extending therethrough in the radial direction, a rod in each half-joint extending diametrically between said two opposed transmitting arms of the half-joint and mounted at its ends in the said holes, said two rods being disposed one behind the other in cruciform relationship in the assembled joint, so as to prevent separation of the two half-joints, a pressure pad engaged between said two rods, a bearing member provided in the body of each half-joint and the face of each rod which is remote from the other rod, being in engagement with the bearing member which is provided in the half-joint associated with said other rod.

6. In a universal joint comprising two half-joints, a shaft portion on each half-joint, angularly spaced transmitting arms radiating from each shaft portion, driving members pivotally mounted on said transmitting arms, the arms of one half-joint being disposed in the spaces between the arms of the other half-joint and the driving members on the two sets of arms being in cooperating engagement to transmit the drive from one half-joint to the other; a rod in each half-joint extending diametrically between two opposed transmitting arms of the half-joint, a pressure pad engaged between said two rods, said pressure pad having two opposed faces each of which had a straight groove of part-circular cross-section and the two grooves being mutually at right angles, said two rods being disposed one behind the other in the assembled joint and engaging in said grooves so as to prevent separation of the two half-joints, the body of each half joint having a slot cut therein, a bearing member in the form of a part-circular plate having a straight face and a curved face being mounted in the body of each half-joint with the curved face of the bearing member seated in the slot, and the face of each rod which is remote from the other rod, being in engagement with the straight face of the bearing member which is provided in the half-joint associated with said other rod.

References Cited in the file of this patent

UNITED STATES PATENTS

| | | |
|---|---|---|
| 915,690 | McClintock | Mar. 16, 1909 |
| 1,965,853 | Morrison | July 10, 1934 |
| 2,617,278 | Sindelar | Nov. 11, 1952 |
| 2,672,740 | Dunn | Mar. 23, 1954 |